(12) United States Patent
Pramod et al.

(10) Patent No.: US 10,530,282 B2
(45) Date of Patent: *Jan. 7, 2020

(54) CURRENT CAPABILITY LIMITING OF DC MACHINES

(71) Applicant: STEERING SOLUTIONS IP HOLDING CORPORATION, Saginaw, MI (US)

(72) Inventors: Prerit Pramod, Saginaw, MI (US); Krishna Mohan Pavan Namburi, Saginaw, MI (US); Julie Ann Kleinau, Bay City, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 2 days.

This patent is subject to a terminal disclaimer.

(21) Appl. No.: 15/603,671

(22) Filed: May 24, 2017

(65) Prior Publication Data

US 2017/0346423 A1 Nov. 30, 2017

Related U.S. Application Data

(60) Provisional application No. 62/341,407, filed on May 25, 2016.

(51) Int. Cl.

| | |
|---|---|
| *H02P 7/06* | (2006.01) |
| *G05B 19/406* | (2006.01) |
| *H02P 7/285* | (2016.01) |
| *B62D 5/04* | (2006.01) |
| *G05B 19/416* | (2006.01) |
| *H02K 23/00* | (2006.01) |
| *H02P 29/024* | (2016.01) |

(52) U.S. Cl.
CPC .............. *H02P 7/06* (2013.01); *B62D 5/0421* (2013.01); *B62D 5/0463* (2013.01); *G05B 19/406* (2013.01); *G05B 19/416* (2013.01); *H02K 23/00* (2013.01); *H02P 7/285* (2013.01); *H02P 29/027* (2013.01); *B60Y 2400/602* (2013.01); *G05B 2219/42296* (2013.01); *G05B 2219/43204* (2013.01)

(58) Field of Classification Search
CPC .... B65D 5/065; B65D 5/0487; B65D 5/0463; B65D 5/0472; B65D 5/006; H02P 6/28; H02P 2209/07; H02P 21/22
USPC ............................ 318/400.01, 727, 432, 434
See application file for complete search history.

(56) References Cited

U.S. PATENT DOCUMENTS

| | | | |
|---|---|---|---|
| 6,392,418 B1 * | 5/2002 | Mir ........................ | B62D 5/046 318/716 |
| 7,042,227 B2 * | 5/2006 | Mir ........................ | B62D 5/046 318/432 |

(Continued)

FOREIGN PATENT DOCUMENTS

CN 102301581 A 12/2011

*Primary Examiner* — Rina I Duda (57) ABSTRACT

An embodiment of a control system includes a current command module configured to receive a torque command and output a current command for controlling a direct current (DC) motor, and a current capability limiting module configured to receive the current command and a current limit indicating a maximum motor current, limit the current command based on the current limit, and actively further limit the current command based on a capability limit value.

17 Claims, 5 Drawing Sheets

(56) References Cited

U.S. PATENT DOCUMENTS

| | | | | |
|---|---|---|---|---|
| 7,584,816 B2* | 9/2009 | Miyajima | ............. | B62D 5/006 |
| | | | | 180/421 |
| 7,849,957 B2* | 12/2010 | Hara | ................. | B62D 15/0235 |
| | | | | 180/446 |
| 2008/0027609 A1* | 1/2008 | Aoki | ................... | B62D 5/0463 |
| | | | | 701/43 |
| 2009/0234538 A1* | 9/2009 | Ta | ......................... | B62D 5/046 |
| | | | | 701/41 |

* cited by examiner

CURRENT CAPABILITY LIMITING OF DC MACHINES

CROSS-REFERENCES TO RELATED APPLICATIONS

This patent application claims priority to U.S. Provisional Patent Application Ser. No. 62/341,407, filed May 25, 2016 which is incorporated herein by reference in its entirety.

BACKGROUND OF THE INVENTION

The present invention relates to methods and systems for controlling or managing DC machines, and more particularly to methods and systems for limiting current capability of DC machines.

Electrical power steering (EPS) systems use an electric motor as an actuator to provide assist to a driver while steering a vehicle and/or to provide vehicle control. Brushed DC machines are widely used in the Electric Power Steering (EPS) industry for low-cost applications and platforms. Electric drive systems employing such machines require fewer sensors and low-cost electronic circuitry and are able to deliver good performance through the entire operating space.

Brushed DC machines have a mechanical commutator which is connected to windings through brushes and slip rings. When current flows through the windings, this results in a current and position dependent voltage drop, commonly referred to as the brush voltage drop, which is highly nonlinear in nature. Due to the sizing of machines for low-cost applications, the machine is often operated near its capability limit. During motor control operation, the operating conditions can vary widely, and if the torque and current commands are not limited precisely, the machine invariably may cause actuator saturation (i.e., commanded voltages exceeding the bus voltage limit), resulting in undesirable performance in terms of sub-optimal command tracking, torque ripple and audible noise.

SUMMARY OF THE INVENTION

An embodiment of a control system includes a current command module configured to receive a torque command and output a current command for controlling a direct current (DC) motor, and a current capability limiting module configured to receive the current command and a current limit indicating a maximum motor current, limit the current command based on the current limit, and actively further limit the current command based on a capability limit value.

An embodiment of a method of controlling a direct current (DC) motor includes receiving a torque command and generating a current command by a current command module, and receiving the current command and a current limit at a current capability limiting module, the current limit indicating a maximum electrical current. The method also includes limiting the current command based on the current limit, and actively further limiting the current command based on a capability limit value.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
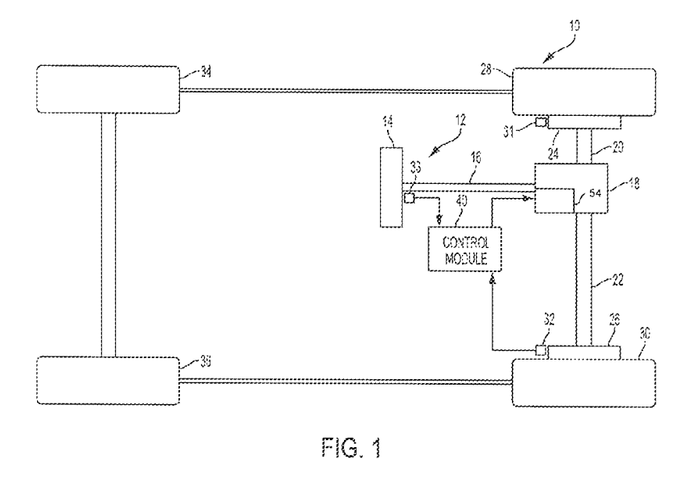
FIG. 1 is a functional block diagram illustrating a vehicle including a steering control and/or assistance system in accordance with an embodiment of the invention.

Referring now to FIG. 1, where the invention will be described with reference to specific embodiments without limiting same, an embodiment of a vehicle 10 including a steering system 12 such as an electrical power steering (EPS) and/or driver assistance system is illustrated. In various embodiments, the steering system 12 includes a handwheel 14 coupled to a steering shaft 16. In the embodiment shown, the steering system 12 is an electric power steering (EPS) system that further includes a steering assist unit 18 that couples to the steering shaft 16 of the steering system 12 and to tie rods 20, 22 of the vehicle 10. The steering assist unit 18 includes, for example, a steering actuator motor 54 (e.g., electrical motor) and a rack and pinion steering mechanism (not shown) that may be coupled through the steering shaft 16 to the steering actuator motor and gearing. During operation, as the handwheel 14 is turned by a vehicle operator, the motor of the steering assist unit 18 provides the assistance to move the tie rods 20, 22 which in turn moves steering knuckles 24, 26, respectively, coupled to roadway wheels 28, 30, respectively of the vehicle 10.

The actuator motor 54 is a direct current (DC) electric machine or motor. In one embodiment, the motor 54 is a brushed DC motor. The brushed DC motor 54 includes a stator and a rotor. The stator includes a brush housing having a plurality of circumferentially spaced brushes disposed about a commutator, each brush having a contact face that is in electrical contact with the commutator. Although embodiments described herein are applied to a permanent magnet brushed DC motor 54, they are not so limited and may be applied to any suitable DC machine.

As shown in FIG. 1, the vehicle 10 further includes various sensors that detect and measure observable conditions of the steering system 12 and/or of the vehicle 10. The sensors generate sensor signals based on the observable conditions. In the example shown, sensors 31 and 32 are wheel speed sensors that sense a rotational speed of the wheels 28 and 30, respectively. The sensors 31, 32 generate wheel speed signals based thereon. In other examples, other wheel speed sensors can be provided in addition to or alternative to the sensors 31 and 32. The other wheel speed sensors may sense a rotational speed of rear wheels 34, 36 and generate sensor signals based thereon. As can be appreciated, other wheel sensors that sense wheel movement, such as wheel position sensors, may be used in place of the wheel speed sensors. In such a case, a wheel velocity and/or vehicle velocity or speed may be calculated based on the wheel sensor signal. In another example, the sensor 33 is a torque sensor that senses a torque placed on the handwheel 14. The sensor 33 generates torque signals based thereon. Other sensors include sensors for detecting the position (motor position) and rotational speed (motor velocity or motor speed) of the steering actuator motor or other motor associated with the steering assist unit 18.

A control module 40 controls the operation of the steering system 12 based on one or more of the sensor signals and further based on the steering control systems and methods of the present disclosure. The control module may be used as part of an EPS system to provide steering assist torque and/or may be used as a driver assistance system that can control steering of the vehicle (e.g., for parking assist, emergency steering control and/or autonomous or semi-autonomous steering control).

Aspects of embodiments described herein may be performed by any suitable control system and/or processing device, such as the motor assist unit 18 and/or the control module 40. In one embodiment, the control module 40 is or is included as part of an autonomous driving system.

A processing or control device, such as the control module 40, is configured to control a DC motor such as a brushed DC motor (e.g., the motor 54) according to a control method. Aspects of the control method include executing an algorithm for actively limiting the motor currents based on the operating conditions of the DC motor 54 and/or additional components of a control system such as the system 10. The method includes determining capability limit values (e.g., capability curves) representing current limits of the motor using estimated parameters. The capability limit values and/or capability curves may be used along with externally imposed current limits to limit a commanded current appropriately. Determining the capability limit values may be performed online, e.g., during operation of the DC motor 54 and/or the control system. Limiting the current produced by the motor 54 to the motor capability as described herein enables reduced actuator saturation and therefore, optimal command tracking, as well as reduced torque ripple and audible noise. Further, the algorithm is computationally simple and does not significantly burden the processing device or components thereof (e.g., a Digital Signal Processor (DSP)).

Figure 2:
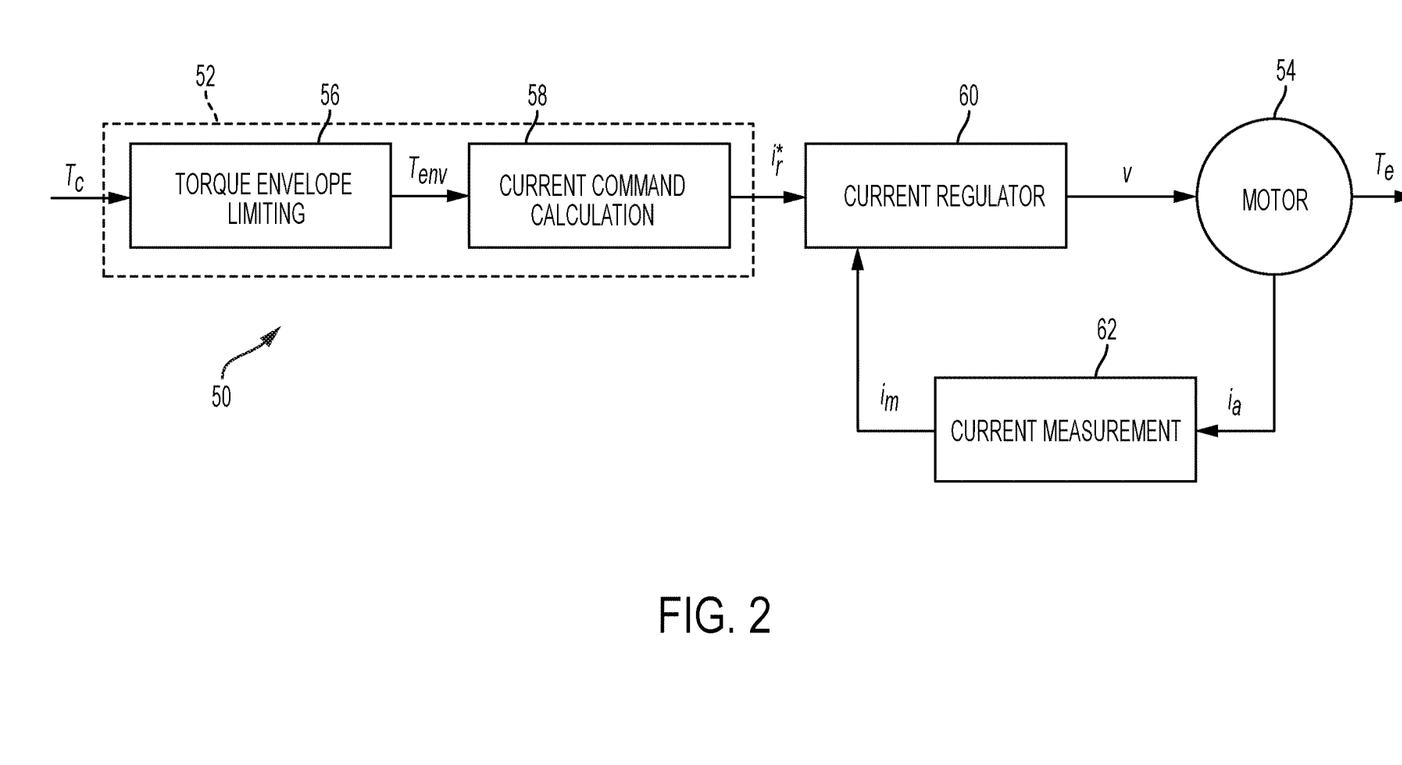
FIG. 2 is a schematic illustrating components, modules and functions of a DC motor control system in accordance with another embodiment of the invention.

Referring now to FIG. 2, a dataflow diagram illustrates an exemplary embodiment of a control device or system 50 for controlling a DC motor, such as a brushed DC motor. The control system 50, in one embodiment, is or includes an EPS control system such as the control module 40 of FIG. 1. In various embodiments, the control device or system (e.g., the module 40) can include one or more sub-modules and datastores. As used herein the terms module and sub-module refer to an application specific integrated circuit (ASIC), an electronic circuit, a processor (shared, dedicated, or group) and memory that executes one or more software or firmware programs, a combinational logic circuit, and/or other suitable components that provide the described functionality. Inputs to the control module 40 can be generated from sensors such as the sensors 31, 32, 33 (FIG. 1) of the vehicle 10 (FIG. 1), can be received from other control modules (not shown) within the vehicle 10 (FIG. 1), can be modeled, and/or can be predefined.

In the example of FIG. 2, the control system 50 includes various modules or sub-modules such as a current command module 52 that receives a torque command ($T_c$) and outputs a current command ($i_r^*$) to a current regulator 60 used for controlling a brushed DC motor 54. The current command module 52 includes a torque envelope limiting module 56 that outputs an enveloped torque command ($T_{env}$) to a current command calculation module 58. The current command is sent to the current regulator 60 that applies a voltage to the DC motor 54 based on the current command. For example, the current regulator generates a voltage command (v) using the current command, which can be converted to a pulse width modulation (PWM) signal that is transmitted to the DC motor via a power converter such as an H-bridge. A current measurement module 62 measures the current produced by the DC motor 54, i.e., a motor current ($i_a$) and outputs a measured current value ($i_m$) to the current regulator 60.

The control system 50 implements a power limiting scheme using the current command module 52. The enveloped torque command ($T_{env}$) is used to generate a current command that is sent to the current regulator 60. The current regulator 60 generates voltage commands to be applied to the DC motor 54 to produce the actual currents and thus the required electromagnetic torque. In one embodiment, for a given motor velocity ($\omega_m$), torque command $T_c$ and DC bus voltage $V_{DC}$ (voltage of a DC bus used in converting DC current to motor voltage) and the estimated motor parameters, a current command to the current regulator 60 may be computed using the following equation:

$$i_r^* = T_c/K_e,$$

where $K_e$ is a motor voltage or torque constant.

The torque envelope may be computed offline based on some nominal operating conditions. However, when the conditions change during real-time operation, this current command ($i_r^*$) may not satisfy the governing voltage-current equations of the machine, causing the current regulator 60 to produce voltage commands that exceed the limit, resulting in undesirable closed loop current control, and thus torque control, performance.

The governing equations for a brushed DC machine are shown below:

$$v = K_e \omega_m + R i_a + L\frac{di_a}{dt} + v_B$$

$$T_e = K_e i_a,$$

where $K_e$ is a motor voltage or torque constant (in V/rad/s), $\omega_m$ is the rotational speed of the motor, R is a resistance of the motor circuit (in Ohms), and L is the inductance of the motor (in Henry). In the above equations, the brush drop voltage (VB) is a nonlinear function of the current ($i_a$) and is mathematically expressed as follows:

$$v_B = \sigma(i_a)V_0\left(1 - e^{-\frac{|i_a|}{I_0}}\right),$$

where $V_0$ and $I_0$ represent the voltage and current variables, respectively

Figure 3:
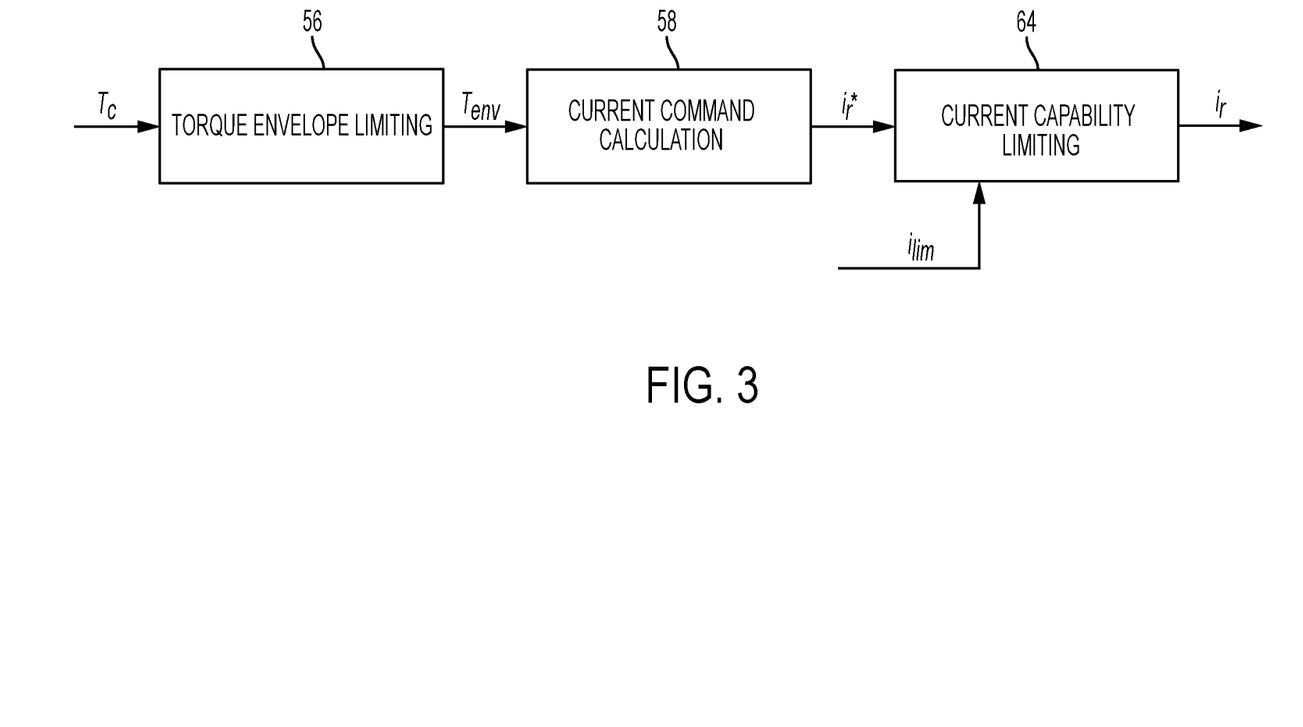
FIG. 3 depicts aspects of a current capability limiting method that can be performed by the motor control system of FIG. 2.

FIG. 3 depicts aspects of an embodiment of a motor current control algorithm that is used to perform a motor control method, and aspects of a processing device or system that can be used to implement the algorithm. The processing device or system can be incorporated in or connected to a motor control system. For example, the motor control method is performed by a current capability limiter or current capability limiting module 64 that is part of or connected to the system 50.

In the motor control method, the current capability limiting module 64 receives an external motor current limit ($i_{lim}$), along with the other signals, and limits the enveloped torque command based on the current limit ($i_{lim}$). The current limiting module 64 can be connected to or include functionality that further limits the enveloped current command to a capability limit of the DC motor 54.

Figure 4:
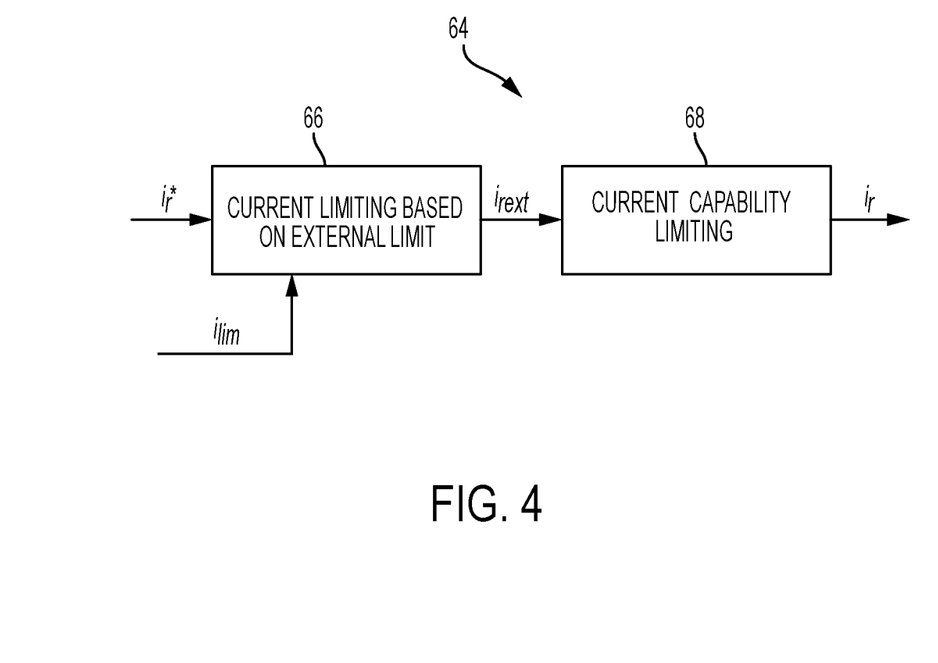
FIG. 4 depicts aspects of a current capability limiting method that can be performed by the motor control system of FIG. 2.

FIG. 4 shows an embodiment of the supply current limiting module 64. In this embodiment, the current capability limiting module 64 receives the current command ($i_r^*$) from the current command calculation module 58 and an externally provided limit ($i_{lim}$), and first limits the current to a first limited current value ($i_{rext}$) as shown by block 66 (e.g., via a current limiting module that is part of or connected to the current capability limiting module 64). The current command may be first limited to the externally provided limit, which may in some instances be a calibration, based on the following logic:

$$i_{rext} = \begin{cases} \sigma(i_r^*)\min(|i_r^*|, i_{lim}), & |i_r^*| \geq i_{lim} \\ i_r^*, & |i_r^*| < i_{lim} \end{cases}$$

The limited current value ($i_{rext}$) is then compared with a motor capability limit value and further limited, as shown by block 68, to ensure that the control system determines optimal current commands based on the operating conditions of the machine. Note that the steady state voltage-current equation is used for capability computation. In one embodiment, the capability limit value includes a maximum capability limit value and/or a minimum capability limit value. The capability limit value(s) may be computed as one or more capability curves that represent the capability limit value(s) as a function of motor speed.

In one embodiment, the motor will have two capability curves, referred to here as the maximum and minimum curves, corresponding to the positive and negative values of $V_{DC}$ respectively. The maximum and minimum curves may be obtained by solving for the current that satisfies the following two equations.

$$f(i_{cp}) = i_{cp}R + K_e\omega_m + \sigma(i_{cp})V_0\left(1 - e^{\frac{|i_{cp}|}{I_0}}\right) - V_{DC} = 0$$

$$f(i_{cn}) = i_{cn}R + K_e\omega_m + \sigma(i_{cn})V_0\left(1 - e^{\frac{|i_{cn}|}{I_0}}\right) + V_{DC} = 0$$

where $i_{cp}$ and $i_{cn}$ represent the positive and negative current values respectively. In one embodiment, since both equations are nonlinear in nature, the aforementioned equations are solved using an iterative solver. For instance, the bisection method may be used to search for the root of the above equations.

In one embodiment, initial end points ($i_{min}$) and ($i_{max}$) within which the roots exist, may be determined by using the following equations:

$$i_{min} = -(1+k)\frac{V_{lim} + K_e\omega_{mlim}}{R}$$

$$i_{max} = (1+k)\frac{V_{lim} + K_e\omega_{mlim}}{R}$$

where $V_{lim}$ and $\omega_{mlim}$ are the absolute maximum (positive) values of $V_{DC}$ and $\omega_m$ respectively, and k is a scale factor to make the end points bigger that base values that is chosen appropriately in order to ensure convergence. Note that other ways to determine the initial end points may also be implemented instead of the aforementioned values.

Figure 5:
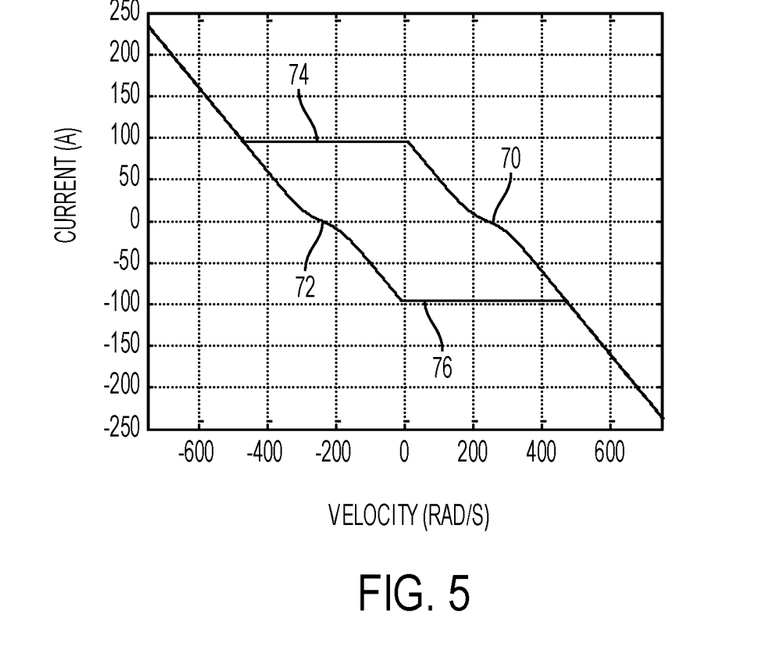
FIG. 5 depicts an example of simulation results based on DC motor current control according to embodiments described herein.

FIG. 5 shows an example of simulation results using the above described embodiments, which show motor current curves (a combination of both the externally provided limits and the capability curves) to which an original current command gets limited.

In this example, a processing device in a control system, such as the current capability limiting module 64, computes motor capability limits as current values ($i_{cp}$) and ($i_{cn}$), as discussed above. Simulation results based on this computation are shown as motor current capability limit curves 70 and 72 that define maximum and minimum motor capability values, respectively, to be applied to a current command. The curves 70 and 72 are also limited by additional curves 74 and 76 that represent the externally provided upper and lower current limits respectively.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A control system, comprising:
a current command module configured to receive a torque command and output a current command; and
a current capability limiting module configured to receive the current command and a current limit indicating a maximum motor current, limit the current command based on the current limit, and actively further limit the current command based on a capability limit value, and output a limited current command to control a brushed direct current (DC) motor;
wherein the capability limit value is determined based on a non-linear function and is distinct from the maximum motor current.

2. The system of claim 1, further comprising a current regulator configured to apply a voltage to the brushed DC motor based on the limited current command.

3. The system of claim 1, wherein the capability limit value includes a motor capability limit curve the specifies the capability limit value as a function of motor speed.

4. The system of claim 3, wherein the capability limit value includes a maximum motor capability limit curve and a minimum motor capability limit curve.

5. The system of claim 1, wherein the capability limit value is calculated based on a DC bus voltage.

6. The system of claim 5, wherein the capability limit value includes a maximum motor current value ($i_{cp}$) based on a positive value of the DC bus voltage and a minimum motor current value ($i_{cn}$) based on a negative value of the DC bus voltage.

7. A control system, comprising:
a current command module configured to receive a torque command and output a current command; and
a current capability limiting module configured to receive the current command and a current limit indicating a maximum motor current, limit the current command based on the current limit, actively further limit the current command based on a capability limit value, and output a limited current command to control a direct current (DC) motor,
wherein the capability limit value is calculated based on a DC bus voltage, the capability limit value includes a non-linear maximum motor current value ($i_{cp}$) based on a positive value of the DC bus voltage and a non-linear minimum motor current value ($i_{cn}$) based on a negative value of the DC bus voltage, wherein the capability limit value is distinct from the maximum motor current, and
the maximum motor current value ($i_{cp}$) is calculated by solving a function $f(i_{cp})$ represented by:

$$f(i_{cp}) = i_{cp}R + K_e\omega_m + \sigma(i_{cp})V_0\left(1 - e^{-\frac{|i_{cp}|}{I_0}}\right) - V_{DC} = 0$$

wherein R is a resistance of the DC motor, $K_e$ is a motor voltage or torque constant, $\omega_m$ is a rotational speed of the DC motor, $V_0$ is a voltage variable, $I_0$ is a motor current, $V_{DC}$ is the DC bus voltage, and $$\sigma(i_{cp})V_0\left(1 - e^{-\frac{|i_{cp}|}{I_0}}\right)$$

is a brush drop voltage.

8. A control system, comprising:
a current command module configured to receive a torque command and output a current command; and
a current capability limiting module configured to receive the current command and a current limit indicating a maximum motor current, limit the current command based on the current limit, actively further limit the current command based on a capability limit value, and output a limited current command to control a direct current (DC) motor,
wherein the capability limit value is calculated based on a DC bus voltage, the capability limit value includes a nonlinear maximum motor current value ($i_{cp}$) based on a positive value of the DC bus voltage and a non-linear minimum motor current value ($i_{cn}$) based on a negative value of the DC bus voltage, wherein the capability limit value is distinct from the maximum motor current, and
the minimum motor current value ($i_{cn}$) is calculated by solving a function $f(i_{cn})$ represented by:

$$f(i_{cn}) = i_{cn}R + K_e\omega_m + \sigma(i_{cn})V_0\left(1 - e^{-\frac{|i_{cn}|}{I_0}}\right) + V_{DC} = 0$$

wherein R is a resistance of the DC motor, $K_e$ is a motor voltage or torque constant, $\omega_m$ is a rotational speed of the DC motor, $V_0$ is a voltage variable, $I_0$ is a motor current, $V_{DC}$ is the DC bus voltage, and $$\sigma(i_{cn})V_0\left(1 - e^{-\frac{|i_{cn}|}{I_0}}\right)$$

is a brush drop voltage.

9. The system of claim 1, wherein the current capability limiting module is connected to or part of an electrical power steering system of a vehicle.

10. A method of controlling a brushed direct current (DC) motor, comprising:
receiving a torque command and generating a current command by a current command module;
receiving the current command and a current limit at a current capability limiting module, the current limit indicating a maximum electrical current;
actively further limiting the current command based on a capability limit value determined based on a non-linear function, wherein the capability limit value is distinct from the maximum motor current; and
applying a voltage to the brushed DC motor based on the limited current command.

11. The method of claim 10, wherein the capability limit value includes a motor capability limit curve the specifies the capability limit value as a function of motor speed.

12. The method of claim 11, wherein the capability limit value includes a maximum motor capability limit curve and a minimum motor capability limit curve.

13. The method of claim 10, wherein the capability limit value is calculated based on a DC bus voltage.

14. The method of claim 13, wherein the capability limit value includes a maximum motor current value ($i_{cp}$) based on a positive value of the DC bus voltage and a minimum motor current value ($i_{cn}$) based on a negative value of the DC bus voltage.

15. The method of claim 14, wherein the maximum motor current value ($i_{cp}$) is calculated by solving a function $f(i_{cp})$ represented by:

$$f(i_{cp}) = i_{cp}R + K_e\omega_m + \sigma(i_{cp})V_0\left(1 - e^{-\frac{|i_{cp}|}{I_0}}\right) - V_{DC} = 0$$

wherein R is a resistance of the DC motor, $K_e$ is a motor voltage or torque constant, $\omega_m$ is a rotational speed of the brushed DC motor, $V_0$ is a voltage variable, $I_0$ is a motor current, $V_{DC}$ is the DC bus voltage, and $$\sigma(i_{cp})V_0\left(1 - e^{-\frac{|i_{cp}|}{I_0}}\right)$$

is a brush drop voltage.

16. The method of claim 14, wherein the minimum motor current value ($i_{cn}$) is calculated by solving a function $f(i_{cn})$ represented by:

$$f(i_{cn}) = i_{cn}R + K_e\omega_m + \sigma(i_{cn})V_0\left(1 - e^{-\frac{|i_{cn}|}{I_0}}\right) + V_{DC} = 0$$

wherein R is a resistance of the DC motor, $K_e$ is a motor voltage or torque constant, $\omega_m$ is a rotational speed of the brushed DC motor, $V_0$ is a voltage variable, $I_0$ is a motor current, $V_{DC}$ is the DC bus voltage, and $$\sigma(i_{cn})V_0\left(1 - e^{\frac{|i_{cn}|}{I_0}}\right)$$

is a brush drop voltage.

17. The method of claim 10, wherein the current capability limiting module is connected to or part of an electrical power steering system of a vehicle.

* * * * *